LINE FINDER DUAL-ALLOTTER SYSTEM

Filed April 13, 1948 8 Sheets-Sheet 1

INVENTOR.
FRANK KESSLER
BY Winfred T. Powell
ATTORNEY

INVENTOR.
FRANK KESSLER
BY
Winifred T. Powell
ATTORNEY

Oct. 20, 1953 F. KESSLER 2,656,416

LINE FINDER DUAL-ALLOTTER SYSTEM

Filed April 13, 1948 8 Sheets-Sheet 3

INVENTOR.
FRANK KESSLER
BY
Winfred T. Powell
ATTORNEY

Oct. 20, 1953 F. KESSLER 2,656,416

LINE FINDER DUAL-ALLOTTER SYSTEM

Filed April 13, 1948 8 Sheets-Sheet 4

INVENTOR.
FRANK KESSLER
BY
Winfred T. Powell
ATTORNEY

LINE FINDER DUAL-ALLOTTER SYSTEM

INVENTOR.
FRANK KESSLER
BY
Winfred T. Powell
ATTORNEY

INVENTOR.
FRANK KESSLER
BY
Winfred T. Powell
ATTORNEY

A-ALLOTTER

INVENTOR.
FRANK KESSLER
BY
Winfred T. Powell
ATTORNEY

B-ALLOTTER

INVENTOR.
FRANK KESSLER
BY
Winfred T. Powell
ATTORNEY

Patented Oct. 20, 1953

2,656,416

UNITED STATES PATENT OFFICE 2,656,416

LINE FINDER DUAL-ALLOTTER SYSTEM

Frank Kessler, Rochester, N. Y., assignor to Stromberg-Carlson Company, a corporation of New York Application April 13, 1948, Serial No. 20,745

21 Claims. (Cl. 179—18)

Figures 1, 7, 8:
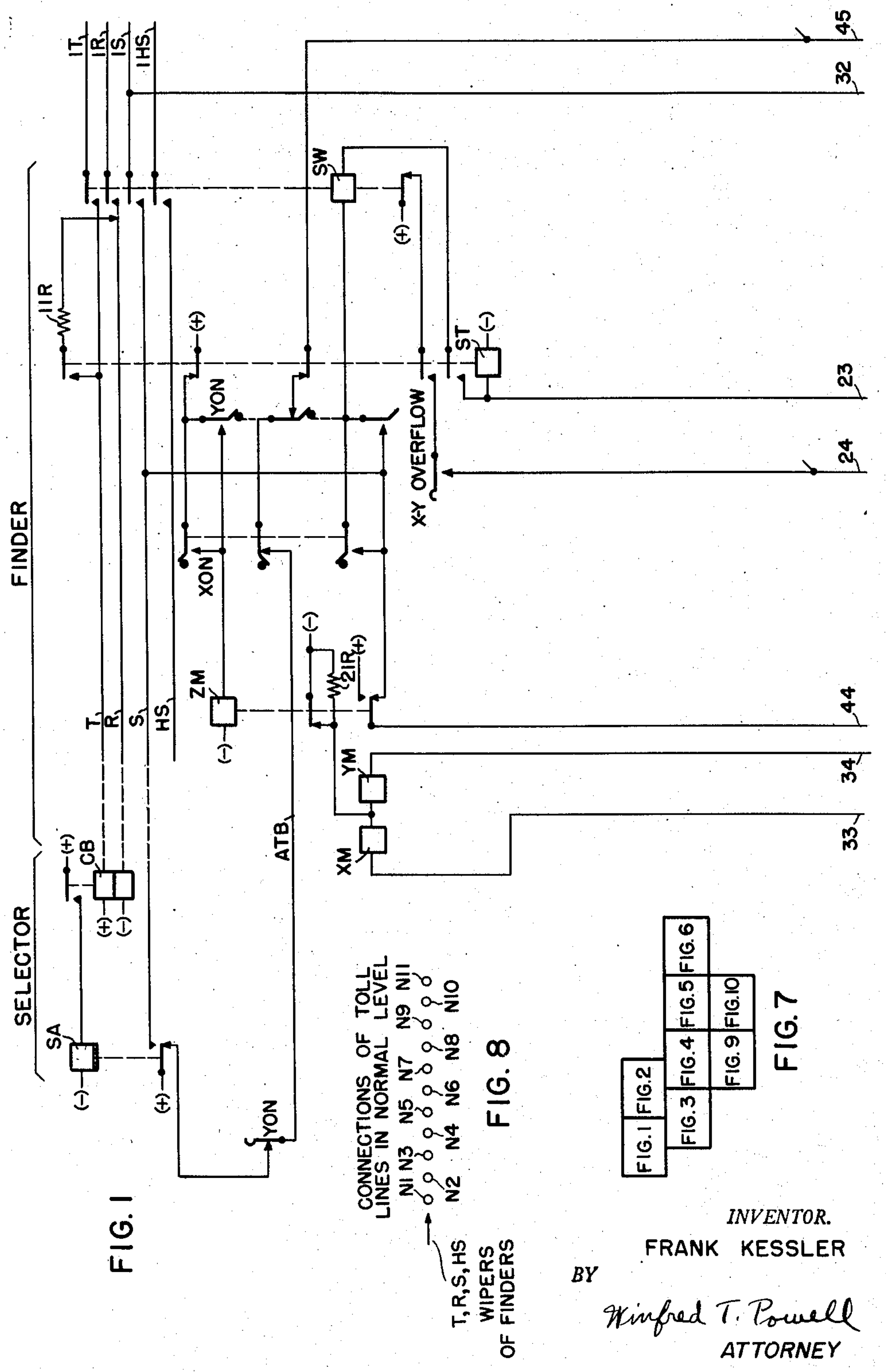

This invention relates in general to automatic telephone systems, but more particularly to such systems in which line finders are employed to connect an allotted line finder switch with a calling line and the principal object of the invention, briefly stated, is the provision of new and improved circuit refinements in finder switch systems, the improvements tending to make the system more reliable, to give uniform high quality service and to make it cheaper to install and maintain.

Another object of the present invention is a new and improved dual allotter arrangement in which one allotter normally controls the operation of an allotted finder and which is arranged to lock itself out of service and switch a calling line to its companion allotter for allotting another line finder, in the event that the first allotted line finder fails to find the calling line and clear out the first mentioned allotter within a predetermined time.

As a further object of the present invention, the allotter and its companion allotter are connected to a timing device which operates within a predetermined time, in case the allotter fails to kick off and select a new line finder, to bring in an alarm signal and lock the allotter out of service until the exchange attendant operates a reset key, the calls normally handled by the allotter being handled by the companion allotter during this locked out condition.

In the embodiment of my invention, I propose to use a line finder switch of the two motion type, i. e., a switch whose wipers are moved first in a primary or X direction to select the desired level and then in a secondary or Y direction to the desired bank contacts in the level. Furthermore, I propose to use a finder switch of the directive type, that is, a switch which is driven in its primary or X direction and in its secondary or Y direction by an external sender mechanism, rather than a finder arrangement of the self interrupted type. This sender mechanism is associated with the common allotter circuit.

Another object of my invention is to provide circuit arrangements whereby if the finder switch which operates in response to a call from a calling line in the group of lines from which it is first seized fails to connect with that line, due to either a mechanical or electrical defect in the finder or the allotter equipment, the allotter involved will be locked out and the finder involved will be released, after which another finder in the common group will be controlled by the second or companion allotter to connect with the calling line.

Another object of my invention is to provide an all finders busy relay in the control equipment, that relay remaining energized as long as an idle finder remains in the group controlled by the equipment. When the last finder in the group is used, the "all finders busy" relay releases and removes the control equipment from service so that all calls from either group of lines are now prevented from operating any of the apparatus in the allotter or finder groups associated with this group of lines. During this condition a busy tone is applied to any calling line as an indication that there is no idle equipment available at this time.

Still another object of my invention is the provision of an overflow arrangement in the line finder switches, whereby 11 lines may be provided in each level of each line finder switch. This is possible in the X–Y switch system to which applicant's invention is applied because the X–Y switch is so designed mechanically that it has access to 11 sets of bank contacts in each level. This arrangement of the X–Y switch is pointed out in the pending application Serial No. 743,415, filed April 23, 1947, and assigned to the same assignee as the present invention, now Patent No. 2,567,650.

A further object of the present invention is the provision of a time delay arrangement in connection with the 11th secondary or Y step of the finder switches, whereby this 11th step may provide an 11th line or trunk on each level. Normally this 11th step in the Y direction is an overflow position and, in the present disclosure, the overflow mechanism functions to cause the release of the circuits if the switch advances to the 11th step and no trunk is connected to the bank terminals of this step. In the event that this 11th step is provided with a trunk line, then the selection of the trunk within a predetermined time will prevent the kick-off operation from the overflow contacts. This feature will be described in detail in the following description.

Another feature of the present invention is the provision of toll lines in the normal level of the finder switch multiple, calls from these toll lines being effective to operate an allotted line finder in its secondary or Y direction only in the normal level for selecting calling toll lines. Such an arrangement makes it possible to provide 110 local lines and 11 toll lines, or a total of 121 lines in the finder switch bank multiple. This is bacause 11 lines are provided on each of the 10 levels requiring an X step and an additional 11 lines in the normal level requiring no X step.

It is believed that a few statements regarding the operation of the system will be a help in understanding the detailed description which follows.

The circuits disclosed provide for finders, allotters and lines for a group of subscribers' lines (110 lines for example) and a group of trunk lines (11 for example).

Both the primary (X) and secondary (Y) magnets of each line finder are operated from a regulated speed and per cent make-break impulse source in each allotter.

Generation of the impulses for driving the X and Y magnets is provided in each allotter, with an arrangement whereby the allotter is stepped to the next finder in case the X or Y operation is advanced to an overflow position, when this position is not used for a line or trunk line. The circuits are so arranged that a start condition from a trunk or toll line has preference over any subscriber's line start condition, or as many trunk calls as are stored at that time.

Two allotters form an AB allotter combination and are provided for each group, with means for omitting one if not required and with means whereby each allotter may be timed out and transferred to the other allotter. After this first time out operation, an additional time out operation is effective to step the other allotter to the next idle finder.

Starting potential from lines in the odd levels of the finders operate by way of the A allotter and from lines in the even levels of the finders by way of the B allotter. When either allotter transfers to the other, the common start and marking leads are connected together so that each finder functions to find on all levels.

Reset keys are provided in each allotter for restoring to normal an allotter which has timed itself out.

The banks of the allotters are arranged in reverse order to prevent the two allotters from falling into step. With this arrangement, when the two allotters get in step at a particular point, the kick off operation functions to kick both allotters away from this same finder terminal, but since the bank connections are in reverse order the first allotter will be advanced from one link say #2 to the next link say #1, while the companion allotter will be advanced from link #2 to link #3 for example.

Further features of the invention relate to the particular arrangement of the circuit elements whereby the above and additional features are attained.

The novel features believed to be characteristic of the invention are set forth in the appended claims. The invention, both as to its organization and method of operation, together with further objects and advantages thereof will be best understood by reference to the following specification taken in connection with the accompanying drawings in which Figs. 1 to 6 inclusive, 9 and 10 taken together and arranged as indicated in Fig. 7 and with correspondingly numbered or lettered lines in alignment illustrate an allotter-finder arrangement having incorporated therein the features of the invention briefly outlined above. Fig. 8 shows the arrangement of toll line in the normal level.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. For example, the various relays and their contacts are illustrated in a conventional manner, with all of the contacts controlled by a particular relay being associated with this relay by means of a dashed line. The ATB relay illustrated in Fig. 3 has most of its contacts shown in association with this relay by means of the dashed line, but this relay is the exception to the above rule in that there are three additional sets of contacts associated with the ATB relay and illustrated in Fig. 5, with the ATB relay being blocked in and a notation provided to the effect that this is the ATB relay shown in the circuit of Fig. 3. This is the only case where contacts of a relay are not shown associated with the relay at the location in the circuit where the relay is controlled. The negative side of the common exchange battery is indicated by (−) and the positive side of the exchange battery, which is usually grounded, is illustrated by (+).

Figure 2:
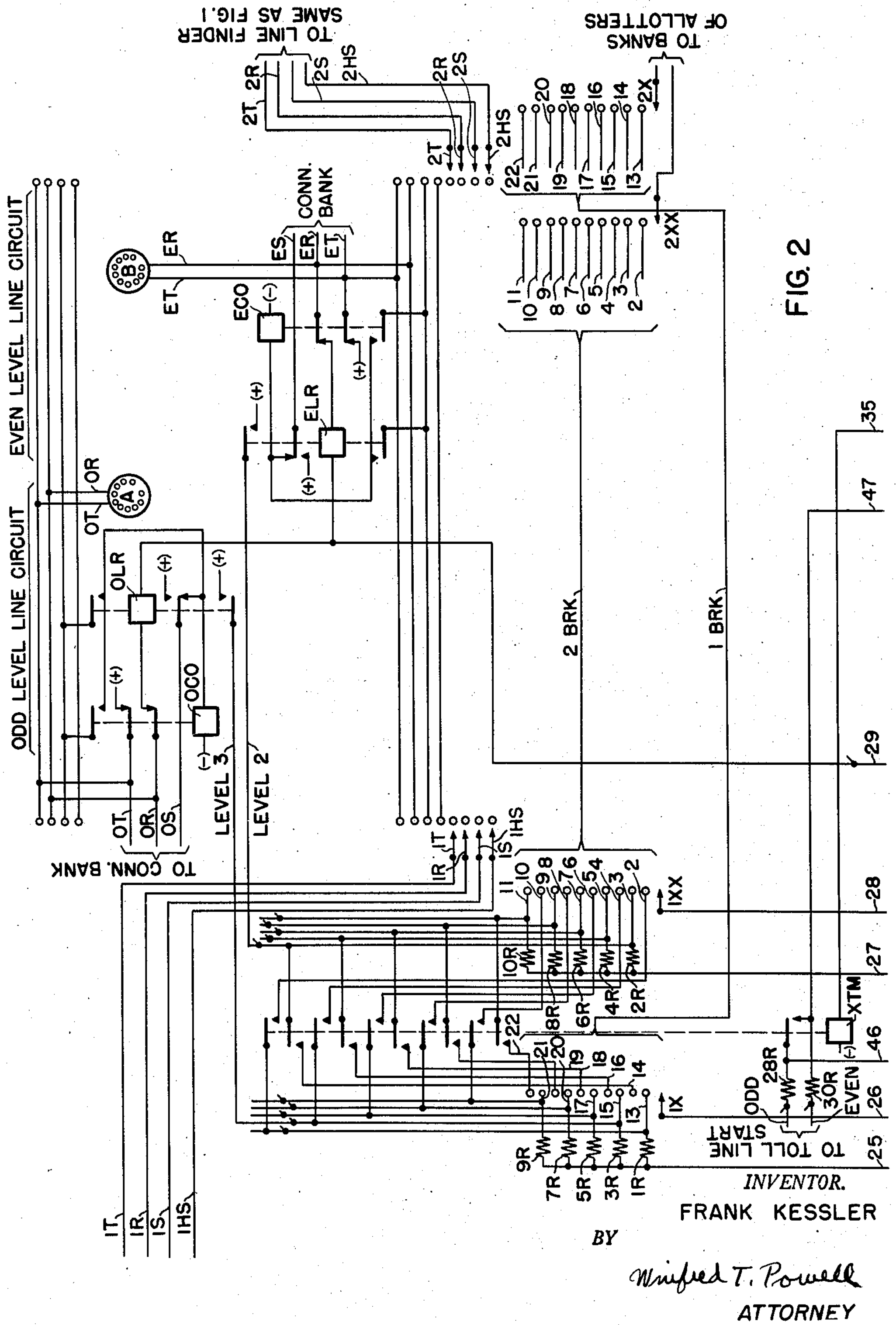
Figure 3:
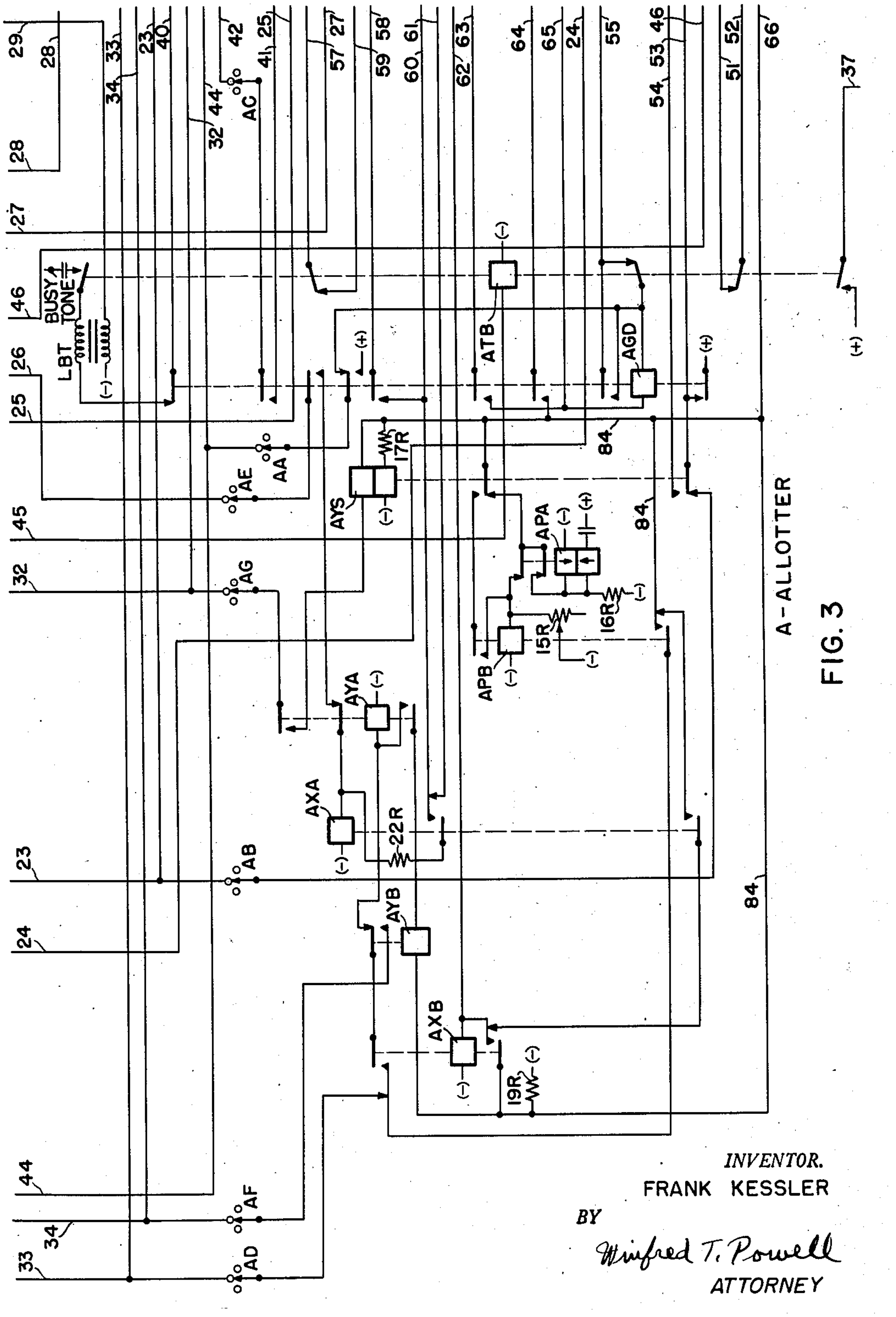
Figure 4:
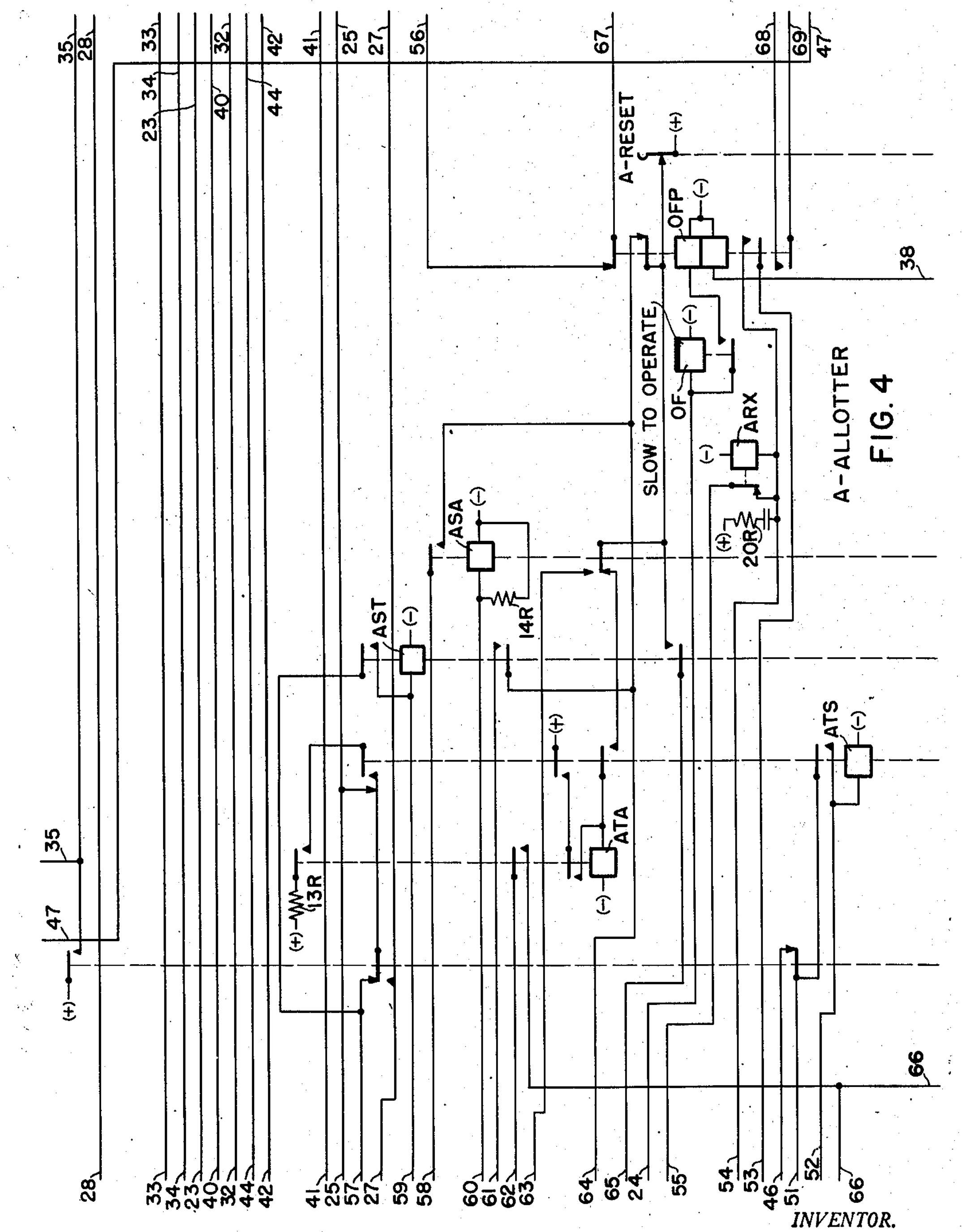
Figure 5:
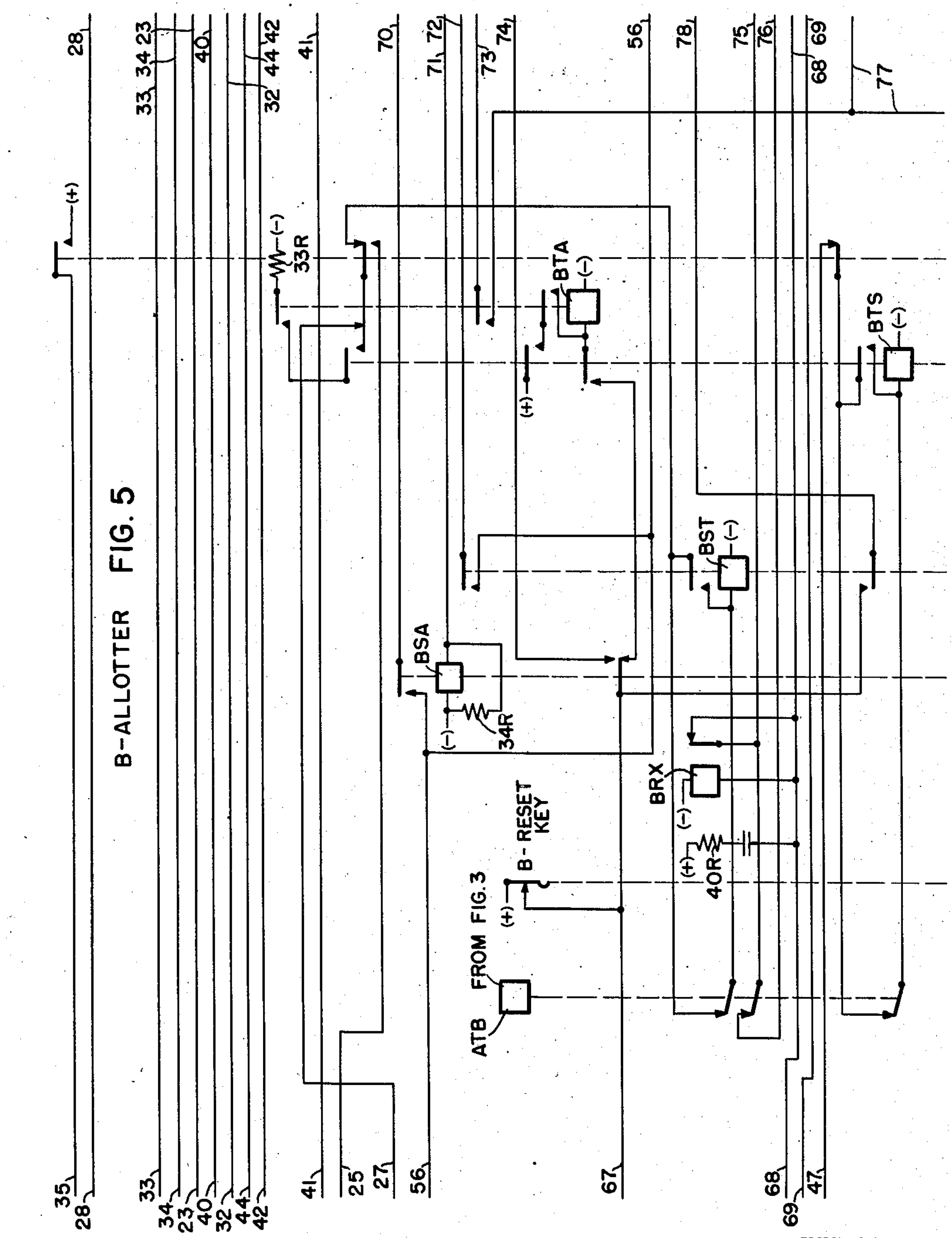
Figure 6:
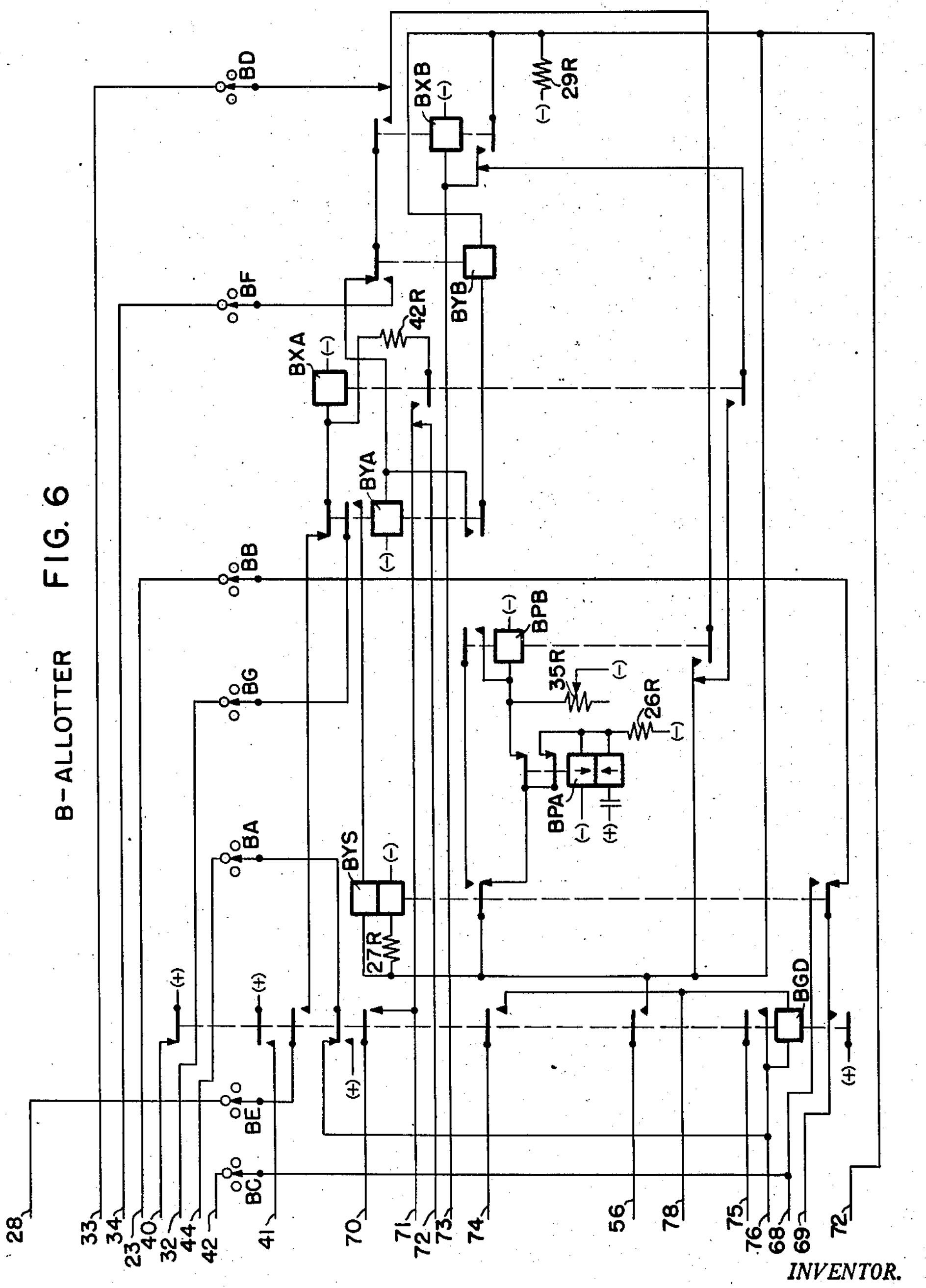

For convenience in describing the operation of the system disclosed it will first be assumed that a call is originated from a line in an odd level, for example line #33 illustrated as connected to sub-station A in the upper portion of Fig. 2.

When the receiver is removed at the sub-station associated with the calling line, a circuit is closed for operating line relay OLR associated with this line extending from (+), break contact of cut off relay OCO, tip side OT of the calling line, calling sub-station, ring side OR of the line, break contact of relay OCO, winding of relay OLR, conductor 29 and winding of link busy tone transformer LBT to (−). This operates relay OLR for immediately making this calling line busy in the connector banks by applying (+) at the lower inner make contact of relay OLR to sleeve conductor OS in the connector banks. Relay OLR, at its upper make contact, closes a circuit from (−) through the winding of relay OCO to the sleeve terminal in the finder banks for marking this line as the one in the third level which is calling. At the outer lower make contact of relay OLR, (+) is connected to the conductor indicated "level 3" for marking the level in the finder switches in which the calling line is located.

The circuit from (+) applied to the "level 3" conductor extends through level resistor 3R, conductor 25, break contact of allotter trunk start relay ATS, break contact of transfer relay ATF, conductor 57, normally closed make contact of "all trunks busy" relay ATB, conductor 59 and winding of relay AST to (−). Relay AST operates and immediately closes a locking circuit for itself extending from the (+) on conductor 25, break contact of relay ATS, break contact of relay ATF, make contact and winding of relay AST to (−). It will be obvious that relay ATB is maintained operated as long as there is one or more idle finders in the group, the circuit extending from (+), break contact of one or more SA relays of the selectors, Y off normal contacts YON, conductor ATB, X and Y off normal contacts XON and YON in series, break contact of start relay ST, common conductor 45 and winding of the ATB relay to (−).

Relay AST closes a circuit for the A start failure lamp ASTFL extending from (+), make contact of relay AST, lamp ASTFL, conductor 36, break contact of the B allotter transfer relay BTF and common delayed alarm circuit (so indicated), it being understood that this common circuit completes the lamp circuit by way of a slow operating device to (—), the alarm not operating until after a sufficient time has been measured off to permit the normal operation of the finder and allotter circuits. If this normal operation is not completed within a predetermined time, then the alarm circuit functions to indicate to the attendant, or to signal a distant office that the A allotter has failed to operate properly.

A circuit is now closed for operating relay ASA associated with the A allotter, this circuit extending from (+), break contact of the A reset key, break contact of the overflow relay OFP, make contact of relay AST, conductor 61, break contact of relay AXA, conductor 60 and winding of relay ASA to (—). Relay ASA immediately closes a locking circuit for itself extending from (+), break contact of the A reset key, break contact of relay OFP, make contact of relay ASA, conductor 58, make contact of relay AGD (operated as will next be explained), conductor 60 and winding of relay ASA to (—). The circuit for operating relay AGD extends from (+), break contact of the A reset key, make contact of relay AST, conductor 65, winding of relay AGD, make contact of relay ATB, conductor 55, break contact and winding of the A allotter stepping magnet ARX to (—). Relay AGD closes a locking circuit for itself extending from (+), break contact of the A reset key, make contact of relay ASA, conductor 63, make contact of relay AGD, winding of relay AGD, and over the rest of the previously described operating circuit for relay AGD including the winding of magnet ARX.

The operation of relay AGD closes a priming circuit for relay AYS to render this relay fast in its operation when the calling line is found by the line finder. This priming circuit extends from (+) on conductor 64, from the A reset key, make contact of relay AGT, conductor 84, resistor 17R and lower winding of relays AYS to (—). It will be understood that the resistance of resistor 17R is sufficiently high to prevent the operation of relay AYS at this time. Furthermore, relay AGD can be operated over the above described circuit only if the A allotter is on an idle finder link. This is because conductor 44 will be connected to (+) if this allotter is not resting on an idle link, by way of a circuit extending from (+), make contact of relay SA of the associated selector, break contact of the finder release magnet ZM, or through a make contact of magnet ZM if the finder is being released at this time, conductor 44, terminal and allotter brush AA and break contact of relay AGD to the point between the winding of this relay and magnet ARX, thus providing a circuit for short circuiting relay AGD and for operating magnet ARX. This advance circuit for the A allotter stepping magnet provides a means for preventing the operation of relay AGD if and when the allotter is stepping along to find an idle link when a call is initiated. The operation of relay AGD immediately applies (+) to the wiper and terminal AA of the A allotter for making this link busy and for stepping the B allotter off this particular link if this B allotter should be resting at this point when the A allotter functions to handle a call. The circuit for stepping the B allotter may be traced from (+), make contact of relay AGD, wiper and terminal AA of the A allotter, conductor 44 extending through Figs. 3, 4 and 5 to Fig. 6, through the terminal and wiper BA of the B allotter, break contact of relay BGD, conductor 76, make contact of relay ATB, break contact and winding of the B allotter stepping magnet BRX to (—).

The operation of relay AGD closes a circuit for operating the start relay ST of the allotted finder (Fig. 1) extending from (+), make contact of relay AGD, break contact of relay AYS, wiper and terminal AB, conductor 23 and winding of relay ST to (—). The operation of relay ST closes a pre-impulse circuit for operating the calling bridge or line relay CB of the allotted link to prepare the link circuit ahead of the extension of the calling line thereto. This circuit may be traced from (+), upper winding of relay CB of the selector, tip conductor T, upper make contact of relay ST, resistor 11R, break contact of switching relay SW, conductor R and lower winding of relay CB to (—). Relay CB closes an obvious circuit for operating slow acting relay SA.

The circuits are now in condition for operating the pulse generating relays APA and APB in the A allotter, these relays serving to drive the allotted finder switch in its X and Y directions for finding the calling line. Before describing the operation of the finder stepping magnets the operating circuits for the APA and APB relays will be explained. It is desirable to provide pulses of proper speed and break-make ratios for driving the stepping magnets of the finder switch. With the arrangement of the APA and APB relays shown in Fig. 3, the proper speed and ratio is obtained. Resistor 15R is variable and is connected in parallel with relay APB and adjusted to provide the proper release time of this relay, it being understood that relay ABP will be operated within a normal time interval when energized because the full battery potential is connected across its winding when pulsing operations begin. The resistor across the winding of relay APB however, renders this relay slightly slow to release.

When relay AGD operates, as above described, (+) on conductor 64 is extended through a make contact of relay AGD to conductor 84, and thence through a break contact of relay AYS to a pair of break contacts on relay APA, this circuit divides and one branch extends to the APB relay for operating this relay At the same time that relay ABP operates the circuit is closed through the upper winding of relay APA for energizing this upper winding. At the same time (+) is applied to the lower winding of relay APA for discharging the condenser connected in series with this winding, this condenser being normally charged through the lower winding of relay APA and resistor 16R in series. Since the energizing current through the upper winding of relay APA and the condenser discharge current through the lower winding apply (+) potential to the left hand terminals of both of these windings and since the windings of these relays are differentially connected, the relay is slightly slow to operate. When the condenser is discharged, current ceases to flow in the lower winding and the relay operates by means of the current in its upper winding.

When relay APA operates, the condenser will again charge over a circuit including the lower winding of this relay and resistor 16R in parallel with the upper winding of this relay. The charging current for the condenser will be in the opposite direction from the above described discharge current, consequently the two windings will be energized in aiding relation by this charging current until the condenser reaches a predetermined charge, thus rendering the APA relay slightly slow to release. It will be observed that the operation of relay APA disconnects grounded conductor 84 from the windings of relays APB and APA for effecting the release of these relays. Relay APB is slightly slow to release, as above described and relay APA is slightly slow to release because of the charging current from the condenser. When the APA relay next releases, the original circuits for the APA and APB relays are again completed, thus causing these relays to again operate, after which they are again released as previously described. Consequently, the APA and APB relays continue to operate and release for providing a pulse generating circuit for driving the switch stepping magnets.

The X magnet for driving the finder in its primary direction is energized over a circuit extending from (+), break contact of the reset key, break contact of relay OFP, conductor 64, make contact of relay AGD, conductor 84, make contact of relay APB, break contact of relay AXP, wiper and terminal AD of the allotter, conductor 33, winding of finder magnet XM and break contact of magnet ZM to (—). It will be seen that each operation of the APB relay closes a driving circuit for the finder switch X magnet. In the present example the finder switch is advanced to the third (odd) level since this is the level in which the calling line is located. When this level is reached the finder switch level brush 1X is in contact with the third level terminal to which conductor 15 is connected, thus providing a stopping circuit for the finder switch which may be traced from (+), make contact of relay OLR of the calling line circuit, conductor 15, terminal and wiper 1X, conductor 26, terminal and wiper AE of the A allotter, make contact of relay AGD, break contact of relay AYA and winding of relay AXA to (—). Relay AXA operates and closes a locking circuit for itself extending from (+), break contact of the A reset key, break contact of relay OFP, make contact of relay ASA, conductor 58, make contact of relay AGD, make contact of relay AXA, resistor 22R and winding of relay AXA to (—). Since relay AXA is operated when magnet XM is energized to advance its level testing brush 1X to the terminal of the third level, the circuits will be maintained until relay APB releases to mark the end of the pulse cycle. The release of relay APB opens up and releases magnet XM and since the finder is at the third level at this time a circuit is closed for operating relay AXB extending from (+), break contact of the A reset key, break contact of relay OFP, conductor 64, make contact of relay AGD, conductor 84, break contact of relay APB, make contact of relay AXA, break contact and winding of relay AXB to (—). Relay AXB immediately closes a locking circuit for itself extending from (+) on conductor 84, make contact and winding of relay AXB to (—). The operation of relay AXB opens up allotter wiper AD for opening up the circuit to the finder X magnet, thus stopping the operation of the finder at the marked level.

It is now in order to cange the switch operating circuit from the X magnet to the Y magnet, since the primary selection has been made. Due to the fact that the wipers of the finder switch are at the proper level the X stepping operation is completed. It is advisable to use a slight delay before starting the secondary or Y magnet operation. This is accomplished by counting off a pulse from the pulse generating relays by means now to be described.

When the relay APB is operated after relay AXB operates, a circuit is closed for operating relay AYA extending from (+) on conductor 64, make contact of relay AGD, conductor 84, make contact of relay APB, make contact of relay AXB, break contact of relay AYB and winding of relay AYA to (—). When relay APB is released a circuit is closed for operating relay AYB extending from (+) on conductor 84, winding of relay AYB, make contact and winding of relay AYA to (—). This circuit, in addition to operating relay AYB, locks relay AYA in its operated position.

When relay APB is next operated, following the operation of relay AYB, a circuit is closed for operating the finder Y magnet YM extending from (+) on conductor 84, make contact of relay APB, make contact of relay AXB, make contact of relay AYB, allotter wiper AF and associated terminal, conductor 34, winding of finder magnet YM and break contact of magnet ZM to (—). This steps the finder in its Y or secondary direction and when relay APB is next released, this circuit is opened for releasing magnet YM. At the next energization of relay APB, magnet YM is again energized over the above described circuit for advancing the finder switch another step in its secondary or Y direction, after which magnet YM is released by the release of relay APB. This secondary operation of the finder switch is continued until the marked line is reached. From the above it will be apparent that relays AYA and AYB count off one pulse from the pulse generating relay APB after the termination of the X magnet operation and before the operation of the Y magnet can be effected, thus providing a delay to allow the finder switch wipers to cease vibrating.

Since it is assumed that the third line in the third level is calling, when the finder magnet YM is energized the third time for advancing the finder switch to the third terminal, a circuit is closed for operating relay AYS for stopping the Y advance of the finder switch. This circuit extends from (+) on conductor 84, upper winding of relay AYS, make contact of relay AYA, allotter wiper AG and its associated terminal, conductor 32, sleeve conductor 1S, finder switch wiper 1S and its associated terminal, make contact of relay OLR and winding of relay OCO to (—). Since relay AYS has been previously primed the closure of this circuit causes it to quickly operate. Relay OCO of the calling line may or may not operate in series with the upper winding of relay AYS, but the OCO relay will be operated following the operation of switching relay SW of the finder link as will now be described. The operation of relay AYS closes a locking circuit for relay APB extending from (+) on conductor 84, make contact of relay AYS, make contact and winding of relay APB to (—). This circuit holds relay APB operated, thus maintaining the above described circuit for magnet YM energized until relay APB is released by the release of relay AYS. The operation of relay AYS closes a circuit for operating relay SW of the line finder extending from (+), make contact of relay SA, make contacts of the X and Y off normal springs of the line finder in multiple, winding of relay SW, make contact and winding of relay ST to (—). This circuit operates relay SW and locks relay ST and is effective because relay AYS opens up the circuit to (+) on conductor 23 for removing the short circuit from the winding of relay SW. A circuit is now closed for operating magnet ARX in the A allotter extending from (+), make contact of relay AGD, make contact of relay AYS, conductor 54 and winding of magnet ARX to (—). The operation of magnet ARX opens up the circuit to (—) for relay AGD for effecting the release of this relay. With relay AGD released the circuit for relay AYS is opened by removing (+) from conductor 84 for effecting the release of this relay. The release of relay AGD opens up the above described circuit for magnet ARX and the A allotter switch is advanced to the next set of terminals by the release of this magnet.

The operation of relay SW of the finder extends (+) by way of conductor S to conductor IS for fully energizing relay OCO of the calling line circuit and this relay is operated and locked over a circuit including a make contact of relay OCO which bridges the make contact of relay OLR. The operation of relay OCO opens up and releases relay OLR and this relay in turn opens up and releases relay AST of the allotted. The release of relay AST de-energizes the failure lamp and slow alarm circuit, it being assumed that relay AST was not energized long enough to permit an alarm signal from this slow operating alarm apparatus.

The release of relay AGD opens up and releases relay ASA and the release of relay AYS opens up and releases relay APB. Since relay AGD disconnects (+) from conductor 84, the APA and APB relays are stopped. The release of relay AGD also opens up and releases relays AXA, AXB, AYA AND AYB, thus restoring the A allotter to normal. The A allotter may now be brought into use again by another call from a line in the odd level since the starting relay AST may be energized by way of conductor 25, as previously described. The AGD relay may be energized to again effect the circuit operations by way of the A allotter as previously described when relay AST extends (+) from the A reset key to the left hand winding of relay AGD only when the AA brush of the allotter is associated with an idle link. As the allotter is advanced over busy links, there will be a (+) potential on the terminals to which wiper AA is connected by way of a conductor similar to conductor 44 as previously pointed out, thus preventing the operation of relay AGD until an idle link is allotted.

When the calling party hangs up the receiver following the completion of the call, the opening up of the line circuit effects the release of relays CB and SA of the connector (not shown) for removing (+) potential from the sleeve conductor S extending back through the finder to the calling line circuit. This opens up and releases cut off relay OCO and relays SW and ST of the finder link. The release of relay ST closes a circuit for energizing release magnet ZM of the finder extending from (+), break contact of relay ST, X and Y off normal contacts XON and YON in multiple and winding of magnet ZM to (—). When the switch is released these off normal contacts are opened for de-energizing the Z magnet thus placing the finder link in its normal condition. It will be noted that magnet ZM applies (+) potential to conductor 44 for maintaining this link busy until the finder switch is restored to normal.

In response to a call from a line in the even level, the operation of the line relay marks the level to which level wiper IXX is connected during the advance of the line finder and extends (+) through one of the resistors 2R to 10R inclusive, depending on the level marked, to conductor 27 for operating relay BST, which is the start relay for the B allotter. The call from an even line causes the circuits of the B allotter to function in a manner similar to that above described for causing an allotted line finder to advance to the terminals of the calling line. It will be understood that all links are in one common group served by the A and the B allotters, with a call from a line in an odd level normally operating through the A allotter for causing any line finder in the group to seize the calling line. Furthermore, a call from a line in an even level causes the B allotter circuits to function in a similar manner for causing an allotted finder in the common group to find the calling line. Since these two alloters may operate at the same time and since each finder can test odd levels by means of its X brush and can test even levels by means of its XX brush, a calling line in an odd level may operate a line finder at the same time that a calling line in an even level operates another line finder, since these two lines control the finders through separate allotters and through separate level wipers on the finders.

In the event that a calling finder fails to stop on the marked level the switch will advance to its X overflow position and close the X-Y overflow contacts. This completes a circuit from (+), break contact of relay SW, make contact of relay ST, overflow contacts, conductor 24 and winding of relay OF to (—). Relay OF operates and extends this circuit to the upper winding of relay OFP for operating this relay. Relay OFP disconnects (+) from conductor 64 for de-energizing conductor 84, which in turn stops the pulse relay operation. Magnet ARX is energized over a circuit extending from (+), make contact of relay AGD, conductor 53, make contact of relay OFP and winding of magnet ARX to (—). The operation of magnet ARX releases relay AGD, which in turn opens up and releases magnet ARX for advancing the A allotter to the next link. When the next idle link is reached, relay AGD may again be energized and the circuits function as previously explained, this time in connection with the next allotted link circuit. It will be obvious that relay ST of the first allotted finder will be released when wiper AB is de-energized by the release of relay AGD, thus effecting the release of the finder switch.

It will now be explained how the circuits function when a call is originated from a line in the odd level handled by way of the A allotter and due to some faulty operation the circuits are not cleared out as above described, thus requiring the intervention of the B allotter for handling the call.

It will be assumed that a call originates from sub-station A associated with line #33 of Fig. 2, consequently the removal of the receiver at this sub-station operates line relay OLR for making this line busy in the connector bank, for preparing the sleeve circuit for operating the cut off relay of this line when found, for marking the level in which the line is located and for marking the line in the level, all as previously described. Relay AST is operated and locked for closing the circuit of the A failure lamp and slow alarm. Relay AST also closes circuits for operating and locking relays ASA and AGD, after which the pulse generating relays APA and APB are operated, all in the previously described manner.

Figure 9:
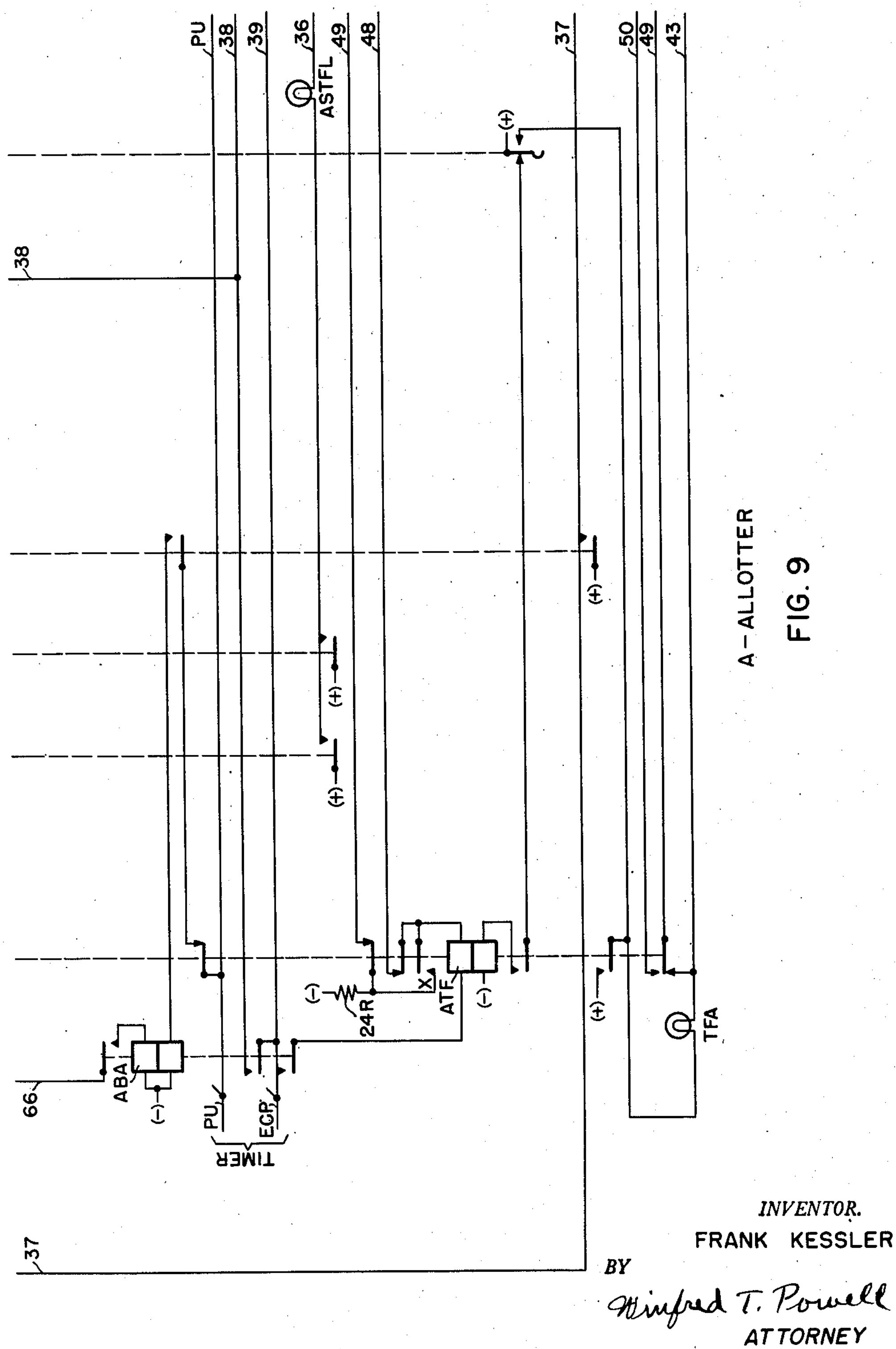
Figure 10:
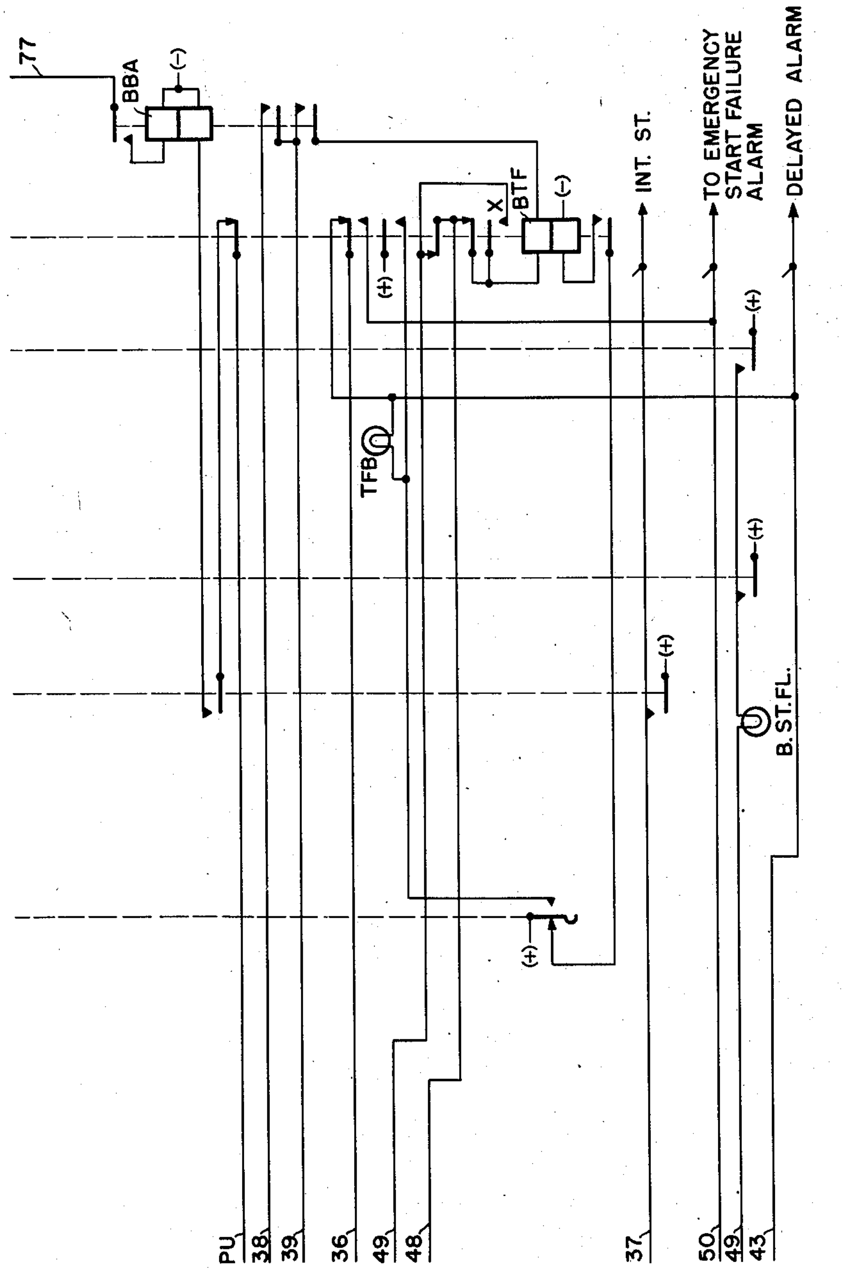

Relay ST of the allotted line finder (assumed to be the finder in Fig. 1) is operated, after which relays CB and SA of the selector are operated as before. These circuit operations close the operating circuit for the X magnet of the allotted finder and in this example, it will be assumed that either the X magnet or the Y magnet fail to operate for clearing out the allotter circuits. When the common pickup interrupter, illustrated in the left hand portion of Fig. 9 is energized, a circuit is closed for operating relay ABA which may be traced from this pickup interrupter, break contact of relay ATF, make contact of relay ASA and lower winding of relay ABA to (—). Relay ABA closes a locking circuit for itself extending from (+) on conductor 84, conductor 66, make contact and upper winding of relay ABA to (—). Since it is assumed that the A allotter circuits are not cleared out within the predetermined time, the (+) pulse applied to common timer conductor ECP, illustrated in the left hand portion of Fig. 9 is effective to operate relays OFP and ATF of the A allotter. The circuit for operating relay OFP may be traced from conductor ECP, make contact of relay ABA, conductor 38 and lower winding of relay OFP to (—). The circuit for operating relay ATF may be traced from conductor ECP, make contact of relay ABA, upper winding of relay ATF, break contact of relay ATF, conductor 48, break contact of relay BTF of the B allotter, conductor 49, break contact of relay ATF and resistor 24R to (—). Relay ATF closes two locking circuits for itself, the first extending through the X make contact of relay ATF (this contact making before any other contacts of this relay are switched) and resistor 24R to (—). The second locking circuit extends from (+), lower break contact of the A reset key, make contact and lower winding of relay ATF to (—). When the pulse on conductor ECP is terminated, relay OFP is released and the termination of this pulse opens up the first described locking circuit for relay ATF, this relay now being locked operated by way of its second locking circuit.

The operation of relay ATF disconnects the common pickup conductor from the operating winding of relay ABA and the operation of relay OFP disconnects (+) from conductors 64 and 66, thus opening up the locking circuit for relay ABA and effecting the release of this relay. A circuit is now closed for operating relay XTM of Fig. 2 extending from (+), make contact of relay ATF, conductor 35 and winding of relay XTM to (—). The operation of relay ATF opens up and releases relay AST and the operation of relay OFP disconnects (+) from conductor 64 for effecting the release of relays ASA and AGD. The operation of relay OFP and the release of relay AGD also stops the pulse generating relays APA and APB, since (+) is removed from conductors 64 and 84. The operation of relay OFP also closes a circuit for energizing the A allotter step magnet extending from (+), make contact of relay AGD, conductor 53, make contact of relay OFP and winding of magnet ARX to (—).

The release of relay AGD opens up this circuit for magnet ARX for effecting the release of this magnet and the advance of the A allotter to the next idle link.

It will be assumed that none of the relays AXA, AXB, AYA, AYB or AYS are operated in response to this call because of the faulty operation of the A allotter or line finder. With relay ATF energized, the A allotter is locked out of service because the operating circuit for the A allotter start relay AST is open. The A allotter transfer lamp TFA is energized over a circuit extending from (+), make contact of relay ATF, lamp TFA and conductor 43 to the delayed alarm circuit for bringing in this alarm after a predetermined time interval.

The release of relay AGD of the A allotter opens up and releases relay ST of the finder and this relay in turn effects the release of relays CB and SA of the finder.

It will now be explained how the B allotter takes over and handles the call from the calling line in the odd level normally served by the A allotter but now to be served by the B allotter because of some circuit failure. Since the operation of the #2 finder failed in this example, relay SW of this finder is not operated. The operation of relay XTM bridges the odd and even level contacts selected by the X and XX wipers respectively of the line finders. Since these level contacts are common to all line finders of the group and since a line finder using its X level selecting wiper failed in this example, the next allotted line finder is controlled by way of the B allotter and the XX brush of this line finder for selecting the level in which the calling line is located. The operation of relay XTM also connects conductors 46 and 47 together, these conductors being controlled to operate the trunk start relays ATS and BTS respectively. The operation of relay ATF disconnects the trunk start conductor 46 from the A allotter trunk start relay ATS and since a call from a trunk line normally using start conductor 46 is now controlled by way of the lower make contact of relay XTM for energizing start conductor 47, the trunk start relay BTS associated with the B allotter will function to handle the call. The toll line operation will be described later.

The B allotter will be stepped off the finder link (if it is standing on this link at this time) by means of the circuit extending from (+), make contact of relay AGD, break contact of relay AYS, A allotter brush AB and its terminal, conductor 23, B allotter brush BB and its terminal, break contact of relay BYS, conductor 69, make contact of relay OFP, conductor 68 and winding of magnet BRX to (—). When relay AGD is released, as above described, this circuit is opened and magnet BRX is de-energized to advance the B allotter to the next idle link.

The B start relay BST is now energized over a circuit extending from (+), make contact of line relay OLR, resistor 3R, conductor 25, break contact of relay ATS, make contact of relay ATF, conductor 27, break contact of relay BTS, break contact of relay BTF, make contact of relay ATB and winding of relay BST to (—). Relay BST closes a locking circuit for itself which includes the above described circuit and the inner upper make contact of relay BST which bridges the normally closed make contact of relay ATB.

Relay BSA is now operated over a circuit extending from (+), break contact of B reset key, conductor 67, break contact of relay OFP, conductor 56, make contact of relay BST, conductor 72, break contact of relay BXA, conductor 71 and winding of relay BSA to (—). Relay BGD is now operated over a circuit extending from (+), break contact of B reset key, make contact of relay BST, conductor 78, winding of relay BGD, conductor 76, make contact of relay ATB, break contact and winding of magnet BRX to (—). It will be observed that relay BGD can only be operated when the B allotter is at rest in association with an idle link because a busy link will apply (+) potential by way of the terminal and wiper BA to the point between the windings of relay BGD and stepping magnet BRX for preventing the operation of relay BGD and for operating magnet BRX to drive the allotter away from this terminal. The operation of relay BGD closes a locking circuit for itself extending from (+), break contact of the B reset key, make contact of relay BSA, conductor 74, make contact and winding of relay BGD, another make contact of relay BGD, conductor 75, break contact and winding of magnet BRX to (—). It will be noted that this locking circuit for relay BGD provides a means for holding this relay operated even though relay ATB is released as an indication that the last link of the group is taken for use. A locking circuit is also closed at this time for relay BSA which may be traced from (+), break contact of B reset key, conductor 67, break contact of relay OFP, conductor 56, make contact of relay BSA, conductor 70, make contact of relay BGD, conductor 71 and winding of relay BSA to (—).

The operation of relay BSA connects the common pickup interrupter PU to the lower winding of relay BBA so that this relay can be operated and locked to start the timing operation for the B allotter. This is for the purpose of providing means for operating relay OFP in response to a pulse on common conductor ECP extended by way of conductor 39 and make contact of relay BBA to conductor 38 which extends back to the lower winding of relay OFP. Consequently, if the B allotter is not cleared out within the predetermined time in connection with this call, relay OFP will be operated and the B allotter advanced to the next link by means of a circuit extending from (+), make contact of relay BGD, conductor 69, make contact of relay OFP, conductor 68 and winding of magnet BRX to (—). It will be obvious that the operation of magnet BRX effects the release of relay BGD, in the manner previously described, for releasing magnet BRX, thus advancing the B allotter to the next idle link. Relay BTF cannot be operated by way of the pulse on conductor 39 applied to its upper winding because conductors 48 and 49 are both open at this time at break contacts of relay ATF.

The pulse generating relays BPA and BPB of the allotter are now operated over circuits extending from (+) on conductor 56 (from the B reset key), make contact of relay BGD, break contact of relay BYS, break contacts of relay BPA and windings of relays BPA and BPB to (—). These BPA and BPB relays go through their cycles of operations by means of circuits exactly like those above described in connection with the A allotter and, therefore, need not be described in detail.

Relay ST of the allotted line finder is operated, when relay BGD operates, over a circuit extending from (+), make contact of relay BGD, break contact of relay BYS, B allotter wiper BB and its terminal (assumed to be in contact with the #3 link), conductor similar to 23 and winding of a start relay similar to relay ST of the allotted line finder to (—). The operation of the ST relay of the line finder provides the pre-impulse for operating the CB and SA relays of this link in the same manner described in connection with the #2 line finder link.

The X magnet of the allotted line finder is now advanced in its primary or X direction by way of a circuit which may be traced from (+) on conductor 56, make contact of relay BGD, make contact of relay BPB, break contact of relay BXB, wiper BD and its associated terminal, conductor similar to 33 and winding of an X magnet similar to XM of Fig. 1 to (—) at the break contact of the associated Z magnet. This circuit functions to drive the line finder in its X direction until it reaches the marked level (assumed to be level #3), at which time relay BXA is operated over a circuit extending from (+), make contact of line circuit line relay OLR, make contact of relay XTM, conductor 4 associated with the third level XX brush terminals of all finders, XX brush of the operating finder, conductor similar to conductor 28, third terminal of B allotter wiper BE, make contact of relay BGD, break contact of relay BYA and winding of relay BXA to (—). Relay BXA closes a locking circuit for itself which may be traced from (+), break contact of the B reset key, conductor 67, break contact of relay OFP, conductor 56, make contact of relay BSA, conductor 70, make contact of relay BGD, make contact of relay BXA, resistor 42R and winding of relay BXA to (—). When relay BPB is released, the X magnet of the allotted finder is released, leaving this finder in association with the marked level and at this time a circuit is closed for operating relay BXB extending from (+) on conductor 56, make contact of relay BGD, break contact of relay BPB, make contact of relay BXA, break contact and winding of relay BXB to (—). Relay BXB closes a locking circuit for itself extending from (+) on conductor 56, make contact of relay BGD, make contact and winding of relay BXB to (—).

Relays BYA and BYB are now operated for counting off a single pulse from the pulse generating relays to introduce a delay between the end of the X stepping and the beginning of the Y stepping operations to enable the finder switch wipers to settle down and stop vibrating. The circuit for relay BYA is closed by the next operation of the BPB relay after relay BXB is operated, this circuit being traced from (+) on conductor 56, make contact of relay BGD, make contact of relay BPB, make contact of relay BXB, break contact of relay BYB and winding of relay BYA to (—). Now when relay BPB next releases a circuit is closed for locking relay BYA and for operating BYB which may be traced from (+) on conductor 56, make contact of relay BGD, winding of relay BYB, make contact and winding of relay BYA to (—). This circuit is effective because (+) is removed from the point between the windings of relays BYA and BYB by the release of relay BPB. The circuit for the Y magnet of the allotted finder is now effective and may be traced from (+) on conductor 56, make contact of relay BGD, make contact of relay BPB, make contact of relay BXB, make contact of relay BYB, wiper BF and third terminal, conductor similar to conductor 34, winding of a Y magnet similar to magnet YM and break contact of a magnet similar to magnet ZM to (—).

The pulse generating relays drive the allotted finder in its Y direction by means of this circuit until the terminal of the calling line is reached, at which time stop relay BYS of the B allotter is operated, it being understood that the BYS relay was primed when the BG relay was operated over a circuit extending from (+) on conductor 56, make contact of relay BGD, resistor 27R and lower winding of relay BYS to (—), thus rendering this BYS relay very fast in its operation to stop the Y stepping when the marked line is reached. The circuit for operating relay BYS may be traced from (+) on conductor 56, make contact of relay BGD, upper winding of relay BYS, make contact of relay BYA, wiper BG and its third terminal, conductor similar to conductor 32, conductor similar to conductor 1S of the allotted link, wiper similar to wiper 1S of the finder and its associated terminal, make contact of line relay OLR and winding of relay OCO to (—).

The operation of relay BYS closes a circuit for operating the switching relay of the allotted link extending from (+), make contact of the SA relay of the selector associated with the allotted link, make contacts in parallel of the X and Y off normal springs of the finder, winding of a relay similar to relay SW of Fig. 1, make contact and winding of a relay similar to relay ST to (—). This circuit for operating the SW relay also completes a locking circuit for the ST relay, this operating circuit for the SW relay being effective because (+) potential is removed from the conductor similar to conductor 23 by the operation of relay BYS and the opening of its lowermost break contact. The operation of the SW relay switches the circuit for the CB relay from the preimpulse circuit to the circuit including the calling line. The operation of relay BYS also closes a circuit for operating magnet BRX extending from (+), make contact of relay BGD, make contact of relay BYS, conductor 68 and winding of magnet BRX to (—). The operation of magnet BRX opens up the energizing circuit of relay BGD, for effecting the release of this relay. The operation of relay SW of the finder effects the release of relay BYS by the application of (+) to a conductor similar to conductor 32 which extends though the terminal and wiper BG of the B allotter to the upper winding of relay BYS for short-circuiting this winding and effecting the release of the relay. It will be understood that relay BYS will not remain operated over the circuit including resistor 27R and its lower winding, but even though this relay does remain operated over this circuit it will be released when relay BGD releases for disconnecting conductors 56 from resistor 27R, conductor 55 being connected to (+) potential. The release of relay BGD opens up the above described circuit to magnet BRX for effecting the release of this magnet and the consequent advance of the B allotter to the next idle link, assumed to be link #4. It will be obvious that there will be an operating circuit for the BRX magnet by way of busy terminals and brush BA for advancing the B allotter to the first idle link, this operating circuit from (+) on these busy terminals also functioning to prevent the operation of relay BGD until the idle link is reached.

Referring back to the operation of relay BYS, a locking circuit is provided for relay BPB, which may be traced from (+) on conductor 56, make contact of relay BGD, make contact of relay BYS, make contact and winding of relay BPB to (—).

When relay BYS is released, this locking circuit for relay BPB is opened for effecting the release of this latter relay, since relay BGD will be released at this time for disconnecting the (+) on conductor 56 from the operating circuit of relay BPB. The release of relay BGD opens up and releases relays BSA, BXA, BXB, BYA and BYB. The release of relay BGD also removes the (+) potential on conductor 56 from the operating circuit of the BPA and BPB relays for preventing the further operation of these relays.

The cut off relay of the calling line is operated by the operation of the SW relay of the line finder over a circuit which may be traced from (+), make contact of the SA relay of the selector, make contact of the SW relay of the finder, a conductor similar to conductor 1S, the S wiper of the line finder and the terminal to which it is connected, make contact of relay OLR and winding of relay OCO to (—). Relay OCO closes a contact in parallel with the make contact of relay OLR for providing a locking circuit for the OCO relay, after which relay OCO opens up and releases relay OLR. The release of OLR disconnects (+) potential from the circuit leading through resistor 3R and conductor 25 and thence by way of a make contact of relay BTF to conductor 27, break contact of relay BTS, break contact of relay BTF, make contact and winding of relay BST to (—) for effecting the release of relay BST. This places the B allotter in its normal condition.

When the calling party hangs up, relays CB and SA of the link circuit in use are released for disconnecting (+) potential from the holding sleeve for in turn effecting the release of relays OCO, ST and SW. The connector and selector circuits (not shown) are released in the well-known manner and the finder is released by the release of relay ST closing an energizing circuit for the release magnet of the finder, thus restoring the link equipment to normal.

From the above description it will be seen that when an allotter is timed out, no finder of the group is locked out. This time out operation simply slows up the operation of the complete group because normally two originating calls in the group, one in an odd level and one in an even level, will function through the A and B allotters to cause two line finders to simultaneously hunt. The time out operation causes the control to be effected by one allotter only for lines in both the odd and even levels, thus permitting only one line finder operation to be effective in the complete group at any one time. It will also be seen that a start condition from a line in an odd level normally operates through the A allotter and any finder X brush to find the level in which the calling line is located that a start condition from a line in an even level operates through the B allotter and any finder XX brush to control the finding operation to this line. Furthermore, the above description explains how the time out operation of the A allotter functions to bridge the odd and even level terminals of all line finders of the group so that the XX brush of any finder functions by way of the B allotter for finding the calling line in either an odd or an even level. Likewise, if the B allotter is timed out, these odd and even level marking terminals are bridged and any line finder will have its finding operation controlled by way of its X brush and the A allotter for finding a line in an odd level or a line in an even level. It has also been pointed out how, if a time out operation is effective for locking out one allotter, the failure of the companion allotter or a finder allotted thereby simply causes this allotter to take another step and allot another finder link.

In the event that all finder links of a group are busy at any one time, common conductor 45 is de-energized for effecting the release of relay ATB. Under this condition, the removal of the receiver at a calling sub-station will operate the associated line relay over a circuit including common conductor 29 and the winding of the induction coil LBT. The (+) potential applied to common conductor 25 by the operation of a line relay under this condition is ineffective to operate the start relay, for example relay AST of the A allotter, because it is open at a make contact of relay ATB. In the event that the A allotter has been timed out, the BST relay cannot be operated under this condition because the winding of this relay is likewise open at a normally closed (now open) make contact of the ATB relay. The calling party hears the busy tone under this condition over a circuit which may be traced from the source of busy tone in the upper portion of Fig. 3, condenser, break contact of relay ATB, winding of coil LBT, break contact of relay AGD, conductor 40 and break contact of relay BGD to (+), this tone inducing a similar tone in the winding of the induction coil LBT to which the calling line is connected.

It will now be explained how the circuits function when additional lines are connected to the 11th sets of Y terminals, it being understood that these lines may be provided in exchanges where the regular 100 line group is not sufficient to take care of all subscribers. It has been explained how the relays OF and OFP of the A allotter are operated when a line finder goes to its X overflow position, for clearing out the circuits. In systems where the 11th or Y overflow terminals are not used, these OF and OFP relays are similarly operated when a line finder goes to its Y overflow position for clearing out the circuits and assigning another line finder. It will be obvious that any line finder of the group causes this overflow operation because common conductor 24 leading to the OF and OFP relays is energized by the closure of the X–Y overflow contacts of any finder.

It will now be assumed that there is a line connected to the bank terminals associated with the 11th Y step of the 3rd level in the line finders and that a call is initiated from this line. Consequently, the circuits will be operated in the previously described manner for causing the illustrated line finder to go to the third level, after which it will be driven over the bank terminals in this level, all as previously described. In this example, the X–Y overflow contacts are operated when the line finder takes its 11th Y step. Since relay ST of the line finder is energized and since relay SW of the line finder is not energized at the time of this 11th step, conductor 24 is energized for energizing relay OF of Fig. 4. This latter relay is slow to operate and it may be as slow as desired by using a dashpot relay. Since there is a substantial interval of time introduced between the closure of the overflow contacts and the extension of energized conductor 24 to the upper winding of relay OFP, this delay permits relay AYS of the A allotter to operate for operating relay SW of the line finder, for extending the link to the calling line and for clearing out the allotter, all in the above described manner. It will be understood that, should the line finder fail to switch through to the line associated with the 11th Y step, relay OF will have sufficient time to operate and extend the connection to relay OFP for clearing out the allotter and finder circuits used and for allotting another finder link. It will also be understood that, should there be no line connected to the 11th Y step, these OF and OFP relays will function in the above described manner for clearing out the allotter and the line finder circuits and for allotting another finder link.

It will now be explained how the circuits function in response to a call from a line (toll line for example) located in the normal level of the finder switch banks. It has previously been pointed out that the system may operate with 10 or 11 lines in each level. This is also true for the normal level of each finder, with an allotted finder operating only in its Y or secondary direction for selecting 10 or 11 lines in the normal level. It is proposed to stagger the line control circuits in the normal level so that odd numbered lines in this level operate through the A allotter to cause a finder to select an odd calling line and arranged for operation through the B allotter for causing selection of even lines in the normal level. These normal level lines are staggered as indicated in Fig. 8 and, since the A and B allotters have separate control circuits and since odd and even numbered toll lines operate through these separate allotters, two calls may be simultaneously handled from the normal level if one of these calls is from an odd numbered line and the other is from an even numbered line.

When an odd calling toll line circuit is closed the line relay, similar to relay OLR of Fig. 2, is operated and this relay, as well as all odd line relays in the normal level, applies (+) to the conductor leading to resistor 28R in the lower left-hand corner of Fig. 2. This conductor does not connect to a terminal of a level selecting brush, such as brush 1X, since the allotted finder does not operate in its X direction from a call of this class. (+) is therefore extended through resistor 28R, conductor 46, break contact of relay ATF, conductor 51, make contact of relay ATB, conductor 52 and winding of relay ATS to (−). Relay ATS applies (+) potential to the A start failure lamp ASTFL for operating this lamp and bringing in the alarm if the circuits do not function properly to clear out, all as described above.

It will be pointed out at this time that the calling toll lines have preference over calling local lines because the operation of relay ATS will effect the operation of relay AXB (as will be later described) to open up the circuit through allotter brush AD and conductor 33 leading to the X magnet of the allotted finder to prevent the operation of the X magnet on a call of this class. Relay ATS also opens upon common start conductor 25, thus preventing the operation of relay AST to mark a call from a local line.

Relay ATA is now operated over a circuit extending from (+), break contact of the A reset key, break contact of relay ASA, make contact of relay ATS and winding of relay ATA to (−). Relay ATA closes a locking circuit for itself extending from (+), make contact of relay ATS, make contact and winding of relay ATA to (−). A circuit is now closed for operating relay AST extending from (+), resistor 13R, make contact of relay ATA, make contact of relay ATS, break contact of relay ATF, conductor 57, make contact of relay ATB, conductor 59 and winding of relay AST to (−). Relay AST closes a locking circuit for itself extending from (+), resistor 13R, make contact of relay ATA, make contact of relay ATS, break contact of relay ATF, make contact and winding of relay AST to (−). A circuit is now closed for operating relay ASA extending from (+), break contact of the A reset key, break contact of relay OFP, make contact of relay AST, conductor 61, break contact of relay AXA, conductor 60 and winding of relay ASA to (−). Relay ASA closes a locking circuit for itself (being completed when relay AGD is operated as will next be described), extending from (+), break contact of the A reset key, break contact of relay OFP, make contact of relay ASA, conductor 58, make contact of relay AGD, conductor 60 and winding of relay ASA to (−). Relay AGD is operated over a circuit extending from (+), break contact of the A reset key, make contact of relay AST, conductor 65, winding of relay AGD, make contact of relay ATB, conductor 55, break contact and winding of magnet ARX to (−). Relay AGD closes a locking circuit for itself extending from (+), break contact of the A reset key, make contact of relay ASA, conductor 63, make contact and winding of relay AGD, another make contact of relay AGD, conductor 55, break contact and winding of magnet ARX to (−).

Relay AGD closes circuits for causing the pulse generating relays APA and APB to go through their cycles in the previously described manner. The operation of relay AGD also closes the previously described circuit for operating relay ST of the allotted line finder, this circuit extending from (+), make contact of relay AGD, break contact of relay AYS, wiper AB and its associated terminal, conductor 23 and winding of relay ST to (−).

Magnet XM of the allotted finder does not operate in this example, but relay AXB does operate over a circuit extending from (+), break contact of the A reset key, break contact of relay OFP, conductor 64, make contact of relay AGD, conductor 84, conductor 66, make contact of relay ATA, conductor 62 and winding of relay AXB to (−). Relay AXB closes a locking circuit for itself extending from (+) on conductor 84, make contact and winding of relay AXB to (−). Relay AYA is now operated over a circuit extending from (+) on conductor 84, make contact of relay APB, make contact of relay AXB, break contact of relay AYB and winding of relay AYA to (−). This circuit for relay AYA is effective only when relay ABP is operated. When relay ABP next releases, relay AYB is operated and relay AYA is locked operated over a circuit extending from (+) on conductor 84, winding of relay AYB, make contact and winding of relay AYA to (−). This operation of the AYA and AYB relays does not perform the same function previously described, that is, introducing a delay between the X and Y operations because there is no X operation in this example.

The operation of relay ST of the allotted finder completes the previously described pre-impulse circuit for effecting the operation of relays CB and SA of the finder. The finder switch Y magnet now advances the finder switch in the Y direction over a circuit extending from (+) on conductor 84, make contact of relay APB, make contact of relay AXB, make contact of relay AYB, wiper AF and its associated terminal, conductor 34, winding of Y magnet and break contact of magnet ZM to (−). The pulse generating relay APB provides pulses for stepping the Y magnet until the finder reaches the marked line, at which time relay AYS will be operated, this latter relay being primed by the operation of relay AGD to make relay AYS fast operating. This priming circuit may be traced from (+) on conductor 84, resistor 17R and lower winding of relay AYS to (−), this circuit preventing sufficient current flow to operate the AYS relay.

When the allotted finder reaches the terminal of the calling line, a circuit is closed for fully energizing relay AYS, this circuit extending from (+) on conductor 84, upper winding of relay AYS, make contact of relay AYA, wiper AG and its associated terminal, conductor 32, conductor 1S, wiper 1S of the finder and its associated terminal, make contact of the line relay of the calling line and winding of the cut off relay to (−). The operation of relay AYS closes a circuit for locking relay APB extending from (+) on conductor 84, make contact of relay AYS, make contact and winding of relay APB to (−). A circuit is closed at this time for operating relay SW of the finder extending from (+), make contact of relay SA, conductor S, Y off normal contact YON, winding of relay SW, make contact and winding of relay ST to (−). This circuit also locks relay ST operated and is effective because conductor 23 is de-energized by the opening of the lowermost break contact of relay AYS.

Magnet ARX is now energized over a circuit extending from (+), make contact of relay AGD, make contact of relay AYS, conductor 54 and winding of magnet ARX to (−). The operation of magnet ARX opens up and releases relay AGD and the release of relay AGD opens up and releases magnet ARX, thus advancing the A allotter to the next idle link. The operation of relay SW of the finder completes the circuit for operating the cutoff relay of the calling line extending from (+), make contact of relay SA, conductor S, make contact of relay SW, conductor 1S, finder switch wiper 1S and its associated terminal, make contact of the line relay and the winding of the cut off relay to (−). The operation of the cut off relay opens up and releases the line relay which in turn removes (+) potential from the circuit including resistor 28R and conductor 46 for effecting the release of relay ATS. Relay AYS is released, either by the short circuiting of its upper winding when (+) is applied to conductor 32 by the operation of relay SW, or when relay AGD is released for removing (+) from conductor 84.

The release of relay ATS opens up and releases relays ATA and AST. The release of relay AST opens up and releases relay ASA. The release of relay AGD opens up and releases relays AXB, AYA and AYB and the pulse generating relays are stopped by the de-energization of conductor 84 by the release of relay AGD. This places the A allotter in condition for handling the next call, the calling line circuit now being extended to the windings of the CB relay of the selector by way of make contacts of relay SW and the 1T and 1R brushes of the line finder.

It should be mentioned at this time that the operation of relay AGD closes a circuit for kicking the B allotter off this finder link (if on this link), this circuit extending from (+), make contact of relay AGD, wiper AA and its associated terminal, conductor 44, terminal and wiper BA of the B allotter, break contact of relay BGD, conductor 76, make contact of relay ATB, break contact and winding of magnet BRX to (—).

When the circuit of the calling line is opened to release the connection, (+) potential is removed from sleeve conductor S for effecting the release of relays ST and SW of the line finder. The line finder switch is now released by means of its Z magnet over a circuit extending from (+), break contact of relay ST, Y off normal contact and winding of magnet ZM to (—).

It is believed that the above explanation of a call from a toll line and the previous explanation of how the B allotter functions to step in and handle calls normally handled by way of the A allotter, when the call through the A allotter fails, is sufficient to indicate how these toll lines are similarly handled by the A allotter under normal conditions and by the B allotter under trouble conditions. It is not believed necessary to explain in detail how a regular line in an even level or an even numbered toll line causes the operation of a line circuit, similar to that connected to substation B of Fig. 2, for causing the B allotter to normally handle the call and for calling in the A allotter in the event that a trouble condition prevents the extension of the connection by way of the B allotter.

In the event that the calling toll line is an even numbered line, the operation of the line relay associated with this line circuit applies (+) to the conductor leading to resistor 30R the circuit then extending through this resistor, conductor 47, break contact of relay BTF of the B allotter, make contact of relay ATB and winding of relay BTS to (—). Current in this circuit operates relay BTS for effecting control of one of the line finders of the common group, this control being by way of allotter B because this is an even numbered toll line. In the event that 11 toll lines are associated with the normal level of the finder switch multiple, a call from the 11th line in this level will cause the allotted line finder to advance to the 11th terminal and, although the Y overflow contacts are closed at this point, the slow operating OF relay will permit the switching through of the finder to the calling line before relay OFP operates to clear out the connection and transfer to the next finder. This operation has previously been described in connection with a call to a local line which advances the allotted finder to the 11th point.

Referring to Figs. 1 and 2, it will be seen that each line finder has a fourth wiper connecting to a fourth terminal at each line multiple, this wiper being indicated 1HS for the first line finder and 2HS for the second line finder. This fourth conductor is for supervisory, metering, restricted service marking or the like, the circuits of this fourth conductor not being shown in the present disclosure since these circuits may or may not be used and form no part of the present invention.

Having described an automatic telephone system as particularly adaptable for use in connection with the line finder type of system controlled by a dual allotter arrangement, it is desired to have it understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the invention except as limited by the appended claims.

What I claim is:

1. In a telephone system; two groups of lines; a control equipment for each group, each control equipment being normally controlled only from its associated group of lines; a group of line finders, each finder having access at all times to all of said lines; means responsive to a calling condition on any of said lines and the operation of the control equipment associated with that line for operating any one of said line finders to seek said calling line; and means for transferring the control equipments from one to the other of said groups of lines for operating any one of said line finders.

2. In a telephone system, a group of lines divided into first and second groups, a finder switch having access to all of said lines, said finder switch having first and second wipers means responsive at all times to a call from a line in either of said groups for starting said finder searching for the calling line, and means controlled by said first and said second wipers for causing said finder to seize lines in said first and said second groups respectively.

3. In a telephone system, a group of lines divided into first and second groups, means for initiating a call on any of said lines, a finder switch having access to all of said lines, said finder switch having first and second wipers, means responsive at all times to the initiation of a call from a line in either of said groups for starting said finder searching for the calling line, means controlled by said first and said second wipers for causing said finder to seize lines in said first and said second groups respectively, and transfer means for causing said finder to seize any calling line irrespective of its group, said means comprising only one of said wipers.

4. In a telephone system, a group of lines divided into first and second groups, means for initiating a call on any of said lines, a plurality of finder switches having access to all of said lines, said finder switch having first and second wipers, means responsive at all times to the initiation of a call from a line in either of said groups for starting any one of said finders searching for the calling line, means controlled by said first and said second wipers for causing the associated finder to seize lines in said first and said second groups respectively.

5. In a telephone system, a plurality of groups of lines, an automatic switch having directive primary and secondary movements, a plurality of wipers positioned by said two movements, a first and a second auxiliary wiper positioned by said primary movement alone, and first and second control means including said first and said second auxiliary wipers respectively for determining the group of lines to be selected by said plurality of wipers.

6. In a telephone system, a plurality of groups of lines, an automatic switch having directive primary and secondary movements, a plurality of wipers positioned by said two movements, a first and a second auxiliary wiper positioned by said primary movement alone, first and second control means including said first and said second auxiliary wipers respectively for determining the group of lines to be selected by said plurality of wipers, and time controlled means causing either said first or said second control means to determine the group of lines to be selected by said plurality of wipers.

7. In a telephone system, a plurality of step-by-step line finders each operated in a primary movement and in a secondary movement by primary and secondary stepping magnets respectively in the associated finder, a common allotter for allotting finders for use, a pulse generating relay in said allotter for operating said primary and said secondary stepping magnets of any allotted one of said line finders, another relay having a slow-to-release characteristic, means for adjusting the length of the releasing period of said another relay, and means utilizing the last-mentioned means for determining the rate of operation of said pulse generating relay.

8. In a telephone system, a group of line finders each having a primary and a secondary hunting movement, a primary test wiper for each finder, counting relays common to all of said finders, means for initiating the primary hunting movement of an idle one of said finders, means responsive to the primary test wiper of said finder encountering a predetermined potential for stopping the primary hunting movement of said finder and for causing the operation of said counting relays to measure off a predetermined time interval, and means responsive to said operation of said counting relays for initiating the secondary hunting movement of said finder.

9. In a telephone system, a group of line finders each having a primary and a secondary hunting movement, a primary test wiper for each finder, pulse generating relays common to all of said finders, counting relays common to all of said finders, means responsive to a call for causing said pulse generating relays to generate pulses, means responsive to said call for temporarily associating said pulse generating relays and said counting relays with any one of said finders, circuits controlled by said pulse generating relays for operating said one finder in its primary and secondary hunting movements, and circuits controlled by said counting relays for changing said one finder from its primary hunting movement to its secondary hunting movement.

10. In a telephone system, two groups of lines, one group of finder switches having access to lines in said two groups, means for operating one of said switches to cause it to search for one calling line in one of said two groups, means controlled by the initiation of a call from another line in the other of said two groups while said one switch is still searching for said one line for initiating the operation of another of said switches before said one switch finds said one line, and timing means controlled by a previous call for preventing the operation of said other switch until said one switch finds said one calling line.

11. In a telephone system, a group of subscriber's lines divided into first and second sub-groups, a plurality of toll lines, a finder switch having access to all of said lines and having first and second wipers, means responsive to a call from a toll line or a subscriber's line in any of the respective sub-groups for starting said finder searching for the calling line, means including said first wiper for causing said finder to seize said calling line when said calling line is in the first subscriber's sub-group, means including said second wiper for causing said finder to seize said calling line when said calling line is in the second sub-group of subscriber's lines, and means independent of said wipers for causing said finder to seize said calling line when said calling line is a toll line.

12. In a telephone system; a group of lines; a group of finders having access to said lines; means including an allotter for allotting an idle one of said finders; means in said allotter responsive to the initiation of a call on any one of said lines for initiating the operation of said allotted finder; means including a stepping relay in said allotter for operating said finder to find the calling line; overflow contacts closed at an overflow step of said finder; a switch-through relay in said finder; line terminals selected at said overflow step, which terminals may or may not be connected to a line; means responsive to the selection of said line terminals when they are not connected to a line and including said overflow contacts for releasing said finder, for preventing the operation of said switch-through relay and for allotting another idle finder; and means responsive to the selection of said line terminals when they are connected to a line for preventing the release of said finder, for effecting the operation of said switch-through relay and for allotting another idle finder.

13. In a telephone system, subscribers' lines, a distributor switch having a plurality of wipers, a plurality of contact sets accessible to said distributor switch wipers, a finder switch associated with each of said contact sets and having a plurality of wipers, a trunk line individual to each finder, switching through means in each finder for connecting the associated trunk line by way of said finder wipers to a calling subscriber's line, means for stepping said distributor switch wipers over contact sets for selecting an idle finder, means for stepping the wipers of a selected finder over contacts sets for selecting a calling line, a time measuring device, means including said time measuring device operated after the selected finder wipers have been stepped to the last contact set of the group for releasing said selected finder and for allotting another finder for selecting said calling line, and means operated after the selected finder wipers have been stepped to the last contact set of the group for selecting a calling line and for allotting another finder for a succeeding call.

14. In a telephone system, a finder switch having a normal level and a plurality of off-normal levels, lines of a first class terminating in said off-normal levels, lines of a second class terminating in said normal level, means for initiating calls from lines of said first and said second classes, common means for directively operating said switch in two directions to select any one of said lines of said first class and in only one direction to select any one of said lines of said second class, means for causing said finder to connect with calling lines of said first and said second classes, and means responsive to simultaneous calls from lines of each class for giving preference to calls initiated from lines of said second class.

15. In a telephone system, a finder switch having a normal level and a plurality of off-normal levels, lines of a first class terminating in said off-normal levels, lines of a second class terminating in said normal level, means for initiating calls from lines of said first and said second classes, common means for directively operating said switch in a primary and a secondary direction to select any one of said first class lines and only in a secondary direction to select any one of said second class lines, means for causing said finder to connect with calling lines of said first and said second classes, and means responsive to calls from a second class line for preventing the operation of said switch in its primary direction by a calling line of said first class during the existence of a calling condition on any second class line.

16. In a telephone system, a plurality of step-by-step line finders, each operated in a primary movement and in a secondary movement by primary and secondary stepping magnets respectively in the associated finder, a common allotter for allotting finders for use, a slow-to-release pulse generating relay in said allotter for operating said primary and said secondary stepping magnets of an allotted one of said line finders, a circuit for energizing said pulse generating relay, another slow-to-release relay having a pair of normally closed contacts, said contacts being included in said energizing circuit whereby said pulse generating relay is de-energized in response to operation of said another relay and operated in response to the release of said another relay, and means for adjusting the releasing time of said another relay in order to adjust the spacing between successive operations of said pulse generating relay.

17. In a telephone system, a plurality of step-by-step line finders, each operated in a primary movement and in a secondary movement by primary and secondary stepping magnets respectively in the associated finder, a common allotter for allotting finders for use, a slow-to-release pulse generating relay in said allotter for operating said primary and said secondary stepping magnets of an allotted one of said line finders, a circuit for energizing said pulse generating relay, means for adjusting the releasing time of said pulse generating relay in order to control the duration of the pulses generated by said pulse generating relay, another slow-to-release relay having a pair of normally closed contacts, said contacts being included in said energizing circuit whereby said pulse generating relay is de-energized in response to operation of said another relay and operated in response to the release of said another relay, and means for adjusting the releasing time of said another relay in order to adjust the spacing between successive operations of said pulse generating relay.

18. In a telephone system, a plurality of step-by-step line finders each operated in a primary movement and in a secondary movement by primary and secondary stepping magnets respectively in the associated finder, a common allotter for allotting finders for use, a pulse generating relay in said allotter for operating said primary and said secondary stepping magnets of any allotted one of said line finders, and means for adjusting the speed and the break-make ratio of the pulses generated by said pulse generating relay, said means comprising adjustable means for rendering said pulse generating relay slow-to-release in order to control the duration of said pulses and a second relay, said second relay being slow-to-release and having means for varying the releasing time thereof in order to adjust the spacing between successive pulses.

19. In a telephone system, a plurality of step-by-step line finders, each operated in a primary movement and in a secondary movement by primary and secondary stepping magnets respectively in the associated finder, a common allotter for allotting finders for use, and a pulse generating relay in said allotter for operating said primary and said secondary stepping magnets of any allotted one of said line finders, means for adjusting the speed and the break-make ratio of the pulses generated by said pulse generating relay, said means comprising adjustable means for rendering said pulse generating relay slow-to-release in order to control the duration of said pulses and a second relay, said second relay being slow-to-release and having means for varying the releasing time thereof in order to adjust the spacing between successive pulses, said second relay also having a pair of normally closed contacts in the energizing circuit for said pulse generating relay, said second relay also being slow-to-operate in order further to determine the duration of said pulses.

20. In a telephone system, a plurality of step-by-step line finders each operated in a primary movement and in a secondary movement by primary and secondary stepping magnets respectively in the associated finder, a common allotter for allotting finders for use, a pulse generating relay in said allotter for operating said primary and said secondary stepping magnets of any allotted one of said line finders, means for adjusting the speed and the break-make ratio of the pulses generated by said pulse generating relay, said means comprising adjustable means for rendering said pulse generating relay slow-to-release in order to control the duration of said pulses, a second relay, said second relay being slow-to-release and having means for varying the releasing time thereof in order to adjust the spacing between successive pulses, said second relay also having a pair of normally closed contacts in the energizing circuit for said pulse generating relay, said second relay also being slow-to-operate, and means for adjusting the operating time of said second relay in order further to determine the duration of said pulses.

21. In a telephone system, two groups of lines, a control equipment for each group, each control equipment normally controlled only from its associated group of lines, a group of line finders, each finder having access at all times to all of said lines, means responsive to a calling condition on any of said lines and the operation of the control equipment associated with that line for operating any one of said line finders to seek said calling line, a timing device operative a predetermined time after a calling condition obtains on any one of said lines, and means responsive to the operation of said timing device before a line is found for transferring the control equipments from one to the other of said groups of lines.

FRANK KESSLER.

References Cited in the file of this patent

UNITED STATES PATENTS

| Number | Name | Date |
|---|---|---|
| 1,580,252 | Jacobsen | Apr. 13, 1926 |
| 1,688,162 | Stehlik | Oct. 16, 1928 |
| 1,778,230 | Saunders | Oct. 14, 1930 |
| 1,841,725 | Gillings | Jan. 19, 1932 |
| 2,115,320 | Saunders | Apr. 26, 1938 |
| 2,137,423 | Taylor | Nov. 22, 1938 |
| 2,289,896 | Bakker | July 14, 1942 |
| 2,400,530 | Bellamy | May 21, 1946 |